United States Patent [19]

Hurst

[11] 4,229,138
[45] Oct. 21, 1980

[54] CABLE TENSION ROLLER

[76] Inventor: George P. Hurst, 235 Hill St., Jackson, Calif. 95642

[21] Appl. No.: 861,604

[22] Filed: Dec. 19, 1977

Related U.S. Application Data

[63] Continuation-in-part of Ser. No. 763,188, Jan. 27, 1977, Pat. No. 4,078,298.

[51] Int. Cl.³ .............................................. B65G 47/74
[52] U.S. Cl. ........................... 414/787; 24/134 KA; 14/22; 366/233; 403/406; 403/407; 403/312; 403/215; 414/756; 432/103
[58] Field of Search .................... 214/1 Q, 1 QC; 24/122.6, 129, 134 KA, 134 L, 136 R, 136 K, DIG. 26; 432/103; 403/215, 312, 406, 407; 29/526, 452, 461; 14/22; 366/233; 414/754, 757, 756, 787

[56] References Cited

U.S. PATENT DOCUMENTS

| | | | |
|---|---|---|---|
| 2,346,613 | 4/1944 | Rumsey, Jr. | 214/1 QC X |
| 3,097,834 | 7/1963 | Hurst | 432/103 X |
| 3,401,924 | 9/1968 | Hurst | 432/103 X |
| 3,669,433 | 6/1972 | Hurst | 432/103 X |
| 4,114,765 | 9/1978 | Kojima | 214/1 QC |

FOREIGN PATENT DOCUMENTS

| | | | |
|---|---|---|---|
| 173468 | 7/1969 | Austria | 366/233 |
| 1005339 | 3/1957 | Fed. Rep. of Germany | 214/340 |
| 439366 | 1/1975 | U.S.S.R. | 214/1 QC |

Primary Examiner—Frank E. Werner
Attorney, Agent, or Firm—Townsend & Townsend

[57] ABSTRACT

A cable suspension system for a rotary drum is disclosed which includes cable tension adjustment features providing dynamic load equalization, traction control and variable load distribution. The system includes an endless cable and at least one set of axially aligned support sheaves suspending the drum at its dynamic center of gravity. The system further includes devices for connecting wire rope in endless loops which incorporate load bearing, adjustment, and flexure features minimizing wear of the wire rope.

10 Claims, 10 Drawing Figures

CABLE TENSION ROLLER

BACKGROUND OF THE INVENTION

This application is a continuation-in-part application of application Ser. No. 763,188, filed Jan. 27, 1977, now U.S. Pat. No. 4,078,298 issued Mar. 14, 1978.

1. Field of the Invention

The invention relates to suspension drive arrangements for rotary drums and particularly to wire rope suspension mechanisms used to support and to drive rotary kilns, agglomerators and the like.

Cable suspended drums find wide application in installations processing ore, coal, cement and the like wherever rotary motion of a loose, heavy load is needed. In particular, a rotary drum kiln carrying a loose, heavy load has a tendency to warp out of round under its own weight when supported by underlying rollers and drive mechanisms. Such warping can dislodge kiln brick and severely damage the refractory wall. It has been discovered that rotary drums suspended by encircling cables (e.g., chains and wire ropes) are less susceptible to circular deformation because the tension of cable loading surrounding the drum counteracts the flattening tendency of the supported load. The distribution of the load support varies with the degree of loading. One technique for adjusting loading support distribution is through the adjustment of lateral spacing of pairs of overhead sheaves upon which suspension cables are carried.

A cable suspended drum by its nature does not have a positive drive if rotated by powering the overhead sheaves. Rotary traction depends primarily on the loading of the drum. As a consequence, insufficient traction may be present to turn a light drum with a heavy load, particularly at startup. Means must therefore be devised for providing adequate traction between the suspension cables and the sheaves under light load conditions.

A cable suspended drum during rotation has a tendency to sway from side to side with load shifts. Moreover, a loose, agglomerated, or partially ground load tends to "climb" one side of the drum to cause a change in the center of mass. This causes an imbalance of loading on the support cables and accelerated cable wear.

Connector pieces are generally used to connect wire rope ends to permit adjustment and replacement of the endless wire ropes. In corrosive or abrasive environments, a wire rope can be expected to wear most rapidly at its connector piece, and particularly at the juncture of the wire rope with the bridge piece. Furthermore, many connector pieces of the known prior art shorten the effective length of the rope loop upon riding over the curved track of a sheave or drum. The result is increased tension on the wire rope unevenly loading the rope, which consequently accelerates wear.

2. Description of the Prior Art

Typical installations wherein a drum suspended by a chain or wire rope system from overhead sheaves are described in U.S. Pat. Nos. 3,097,834, 3,401,924 and 3,669,433. In the systems therein described, a drum is hung on wire ropes from pairs or multiples of overhead sheaves which are supported above overhead horizontal structural beams. Adjustability of the spacing of the sheaves for the purpose of load distribution is provided by lateral adjustment of the sheave axes on shafts on the horizontal structural beams. Unfortunately, lubrication is difficult, and the tracks must be maintained free of debris in order that the sheaves may move freely on the tracks. Otherwise damage may result to the tracks and to the sheave support rollers. Means are needed to eliminate this possibility of damage and to minimize lubrication requirements.

These known prior art patents also disclose connector pieces and cable adjustment devices which represent the state of the art. In the present application the problems identified are concerns not sufficiently addressed in the known prior art.

SUMMARY OF THE INVENTION

A cable suspension and drive system for a rotary drum is disclosed comprising at least one set of axially aligned support sheaves mounted to suspend, by means of wire ropes, a rotary drum at its dynamic center of gravity, means for adjusting load distribution, means for maintaining an artificial load and control traction and endless suspension cables, each cable preferably being a wire rope joined at its ends by a connector piece having features minimizing wear of the wire rope cause by fatigue, variations in tension and friction.

In a particular embodiment, a pair of axially aligned cable suspension sheave sets are mounted on extension arms to overhead pivotal arms suspended from a support frame. Mechanical adjustment of the relative position of the sheaved arms is provided for varying the circumferential load distribution on the drum. An idler roller is provided along one side to counteract the displacement of the dynamic center of gravity and to prevent lateral swinging of the drum. The system includes a means for adjustably loading a light drum under heavy assymetric load conditions to furnish adequate traction between the wire ropes and the sheaves. An alternative embodiment of the cable suspension system is also disclosed in which a single sheave set is employed.

Three embodiments of the wire rope connector are disclosed. In the first embodiment, the connector piece comprises a longitudinal section which straddles an outwardly opening V-shaped rope groove of a sheave and rides along machined upper edges of the sheave thereby to reduce wear on the wire rope in the area of the connector piece. In the second embodiment, two longitudinally joined body pieces are provided which straddle the rope groove and run on the machined upper edges. The two body pieces rotate about an axis passing through the central axis of the wire rope on a perpendicular to the curvature of the rope groove. In the third embodiment, a hydraulic shifting mechanism is incorporated into the connector.

A cable suspension system as herein disclosed minimizes the need for lubrication of the sheaves and reduces the likelihood of damage to the sheave rollers due to contamination while providing adjustability of the load distribution. In addition, undesired swing of the rotary drum is eliminated, and fatiguing variation of tension on the cables is minimized. Further, adequate tension is assured for start-up of the cable without slippage of the cables on the sheaves, which may otherwise cause undesired wear. Still further, the wire rope connector is improved to eliminate undue fatigue and undesired shortening of joined wire ropes as the connector passes over the curved contour of a sheave.

These improvements markedly increase the reliability and lifetime of the cable suspension system as well as the rotary drums. Other advantages of the invention will be apparent upon consideration of a detailed description of the particular embodiments. Many of the features have wider application than herein disclosed. For example, the connector pieces may be used with any wire rope drive system wherein fatigue and wear may be a concern.

BRIEF DESCRIPTION OF THE DRAWINGS

The invention will be best understood by reference to the following detailed description taken in conjunction with the accompanying drawings in which.

DETAILED DESCRIPTION OF THE PREFERRED EMBODIMENTS

The present invention is closely related to U.S. Pat. Nos. 3,097,834, 3,401,924, and 3,669,433, and therefore the disclosures of those patents are incorporated herein by reference and made a part hereof. The present invention relates to inventive improvements on the devices described and disclosed in the above-named patents.

Figure 1:
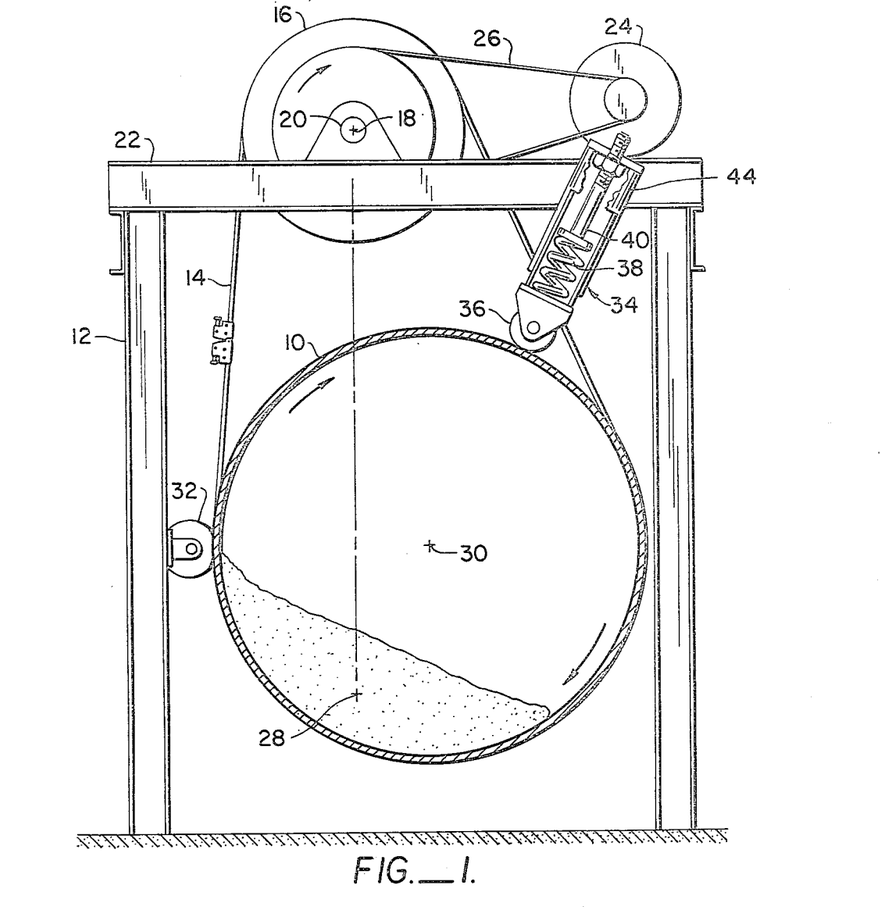
FIG. 1 is a front elevational view in partial cross section of one embodiment of the invention.

Referring first to FIG. 1, there is shown in cross section a wire rope or cable suspended drum 10 such as a rotary kiln, within a support frame 12. The drum 10 extends horizontally or may be inclined relative to the horizontal and suspended within endless wire ropes 14 which are hung from overhead supporting sheaves 16, only one of which is shown. The sheaves are aligned along a sheave axis 18 on a journal bearing 20 mounted above cross-bar 22 of the frame 12. The sheave 16 is driven by a drive motor 24 through belts 26 or the like, the details of which are not important to this invention.

It has been found that material supported within the drum tends to climb the inner walls upon rotation of the drum 10, thereby dynamically shifting the center of gravity 28, as indicated laterally of the drum central axis 30. The result of lateral forces imposed upon the wire ropes 14 and cause excessive wear on the wire ropes 14. As a result, the wire ropes 14 may stretch, and frequency replacement may be necessary. To counteract the problem, lateral rollers 32 are provided on the side of the drum 10 adjacent to dynamic center of gravity 28. Further, the sheave axis 18 is disposed approximately in vertical alignment with the dynamic center of gravity 28. Consequently, lateral forces on the drum 10 are counterbalanced, and swaying and lateral movement of the drum 10 are impeded.

Under extremely assymmetric load conditions, and especially at the start-up of drum rotation, the friction between the wire ropes 14 and the drum 10 may be so low as to result in excessive slippage of the wire rope 14 relative to the drum 10 and the sheaves 16. A consequence is that the drum 10 will not be turned by the wire ropes 14.

According to one aspect of the invention, an externally adjustable loading device 34 is provided to weight down the drum 10, and especially during start-up conditions when loading of the drum 10 may be insufficient to prevent sheave slippage. Such adjustable loading may be provided through a spring-loaded, hydraulic loaded or pneumatic loaded or even a weighted roller 36 riding upon the drum 10. As shown in FIG. 1, roller 36 is mounted to ride upon the drum 10 in alignment with the drum central axis 30 and the expected dynamic center of gravity 28. The roller 36 is biased by a coil spring 38 mounted to an idler arm 40 which is adjustably attached to the frame 12. To control the adjustment, the spring is mounted within an alignment tube 42 which in turn is slideably mounted within a cylinder housing 44 enclosing the spring 38 and the idler arm 40. Other biasing arrangements may be used such as counterweights and the like. For example, referring briefly to FIG. 2, a remotely controllable hydraulic cylinder 46 is shown as an adjustment means. Remote control has the advantage of ready accommodation of varying load conditions during system operation.

Figures 2, 5, 6:
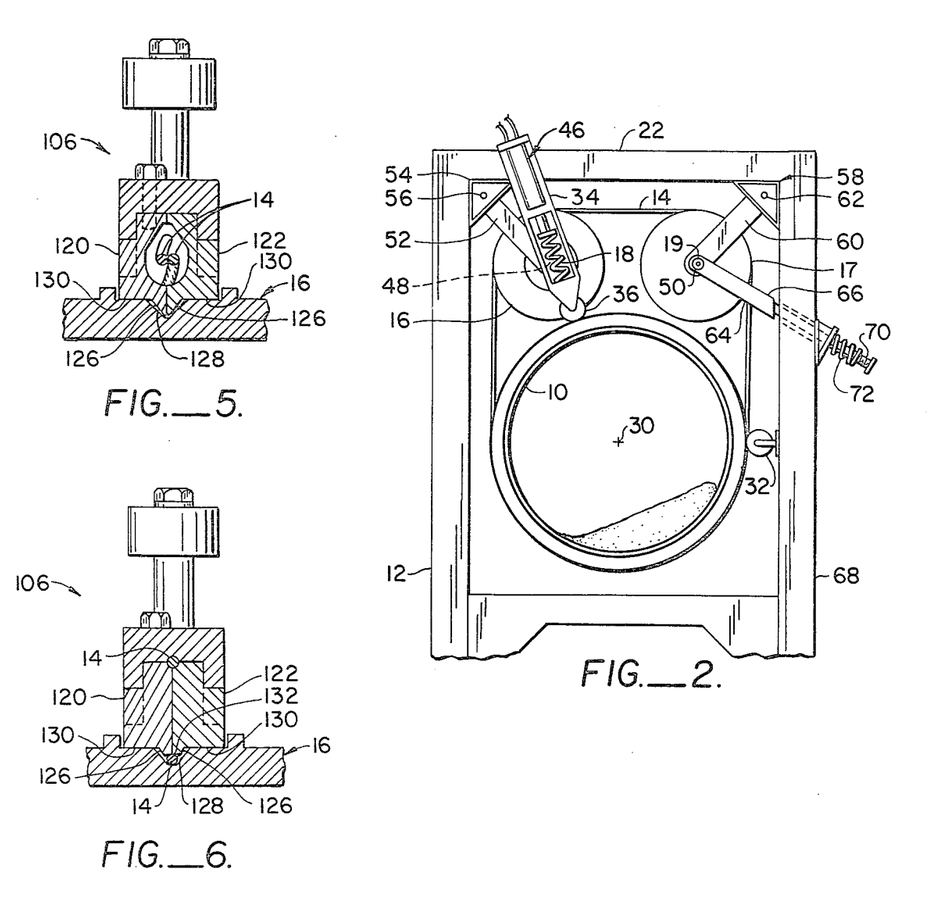
FIG. 2 is a front elevational view in partial cross section of a further embodiment of the invention.
FIG. 5 is a cross-sectional view along line 5—5 of FIG. 4.
FIG. 6 is a cross-sectional view along line 6—6 of FIG. 4.

Turning to FIG. 2, there is shown an alternative embodiment of the invention representing an advancement over the apparatus described in U.S. Pat. No. 3,669,433.

The drum 10 is suspended by two sets of sheaves 16, 17 by endless wire ropes 14. The axes 18 and 19 of the sheaves 16 and 17 extend in the same direction as the central axis 30 of the drum 10 and are rotatable about shafts 50 along the axes. The axes 18 and 19 are offset on either side of a plane perpendicular to the central axis 30 of the drum 10.

There are two types of sheave support arrangements. The first sheave support arrangement comprises a first suspension arm 52 coupled to the shaft of one row of sheaves 16. The suspension arm 52 is attached to the frame 12, preferably at a corner 54 by means of a pivotal hinge 56 which permit the suspension arm 52 to pivot as a pendulum in a plane substantially perpendicular to the drum central axis 30. The other sheave set is also suspended from the frame 12, preferably at a top corner 58 opposite the first suspension arm 52, by a second suspension arm 60. The second suspension arm 60 is pivotally mounted to the frame 12 at a pendular pivot hinge 62. The endless wire ropes 14 are strung around the sheave members 16, 17 and around the drum in a manner drawing the two arrays of sheaves 16 and 17 toward one anothe. The separation of the sheaves 16 and 17 from one another is controlled by a sheave adjustment arm 64. The sheave adjustment arm 64 comprises a strut 66 connected to the suspension arm 60 and a coupling connected to the frame 12, preferably along a vertical post 68 of the frame 12. In this manner sheave adjustment is provided which is transverse to the sheave suspension arm 60, and loading on the strut 66 is a tension load.

The sheave adjustment arm 64 further includes a screw adjustment 70 and a spring 72 for absorbing dynamic load shock and to compensate for irregularities in the location of the central axis and the roundness of drum 10. As a consequence of the suspension of both sheave sets 16 and 17 from the suspension bars, shock related damage and wear to the endless ropes is minimized, and problems related to the lateral adjustment of such sheaves, as those supported in a lateral track in the '433 patent, are eliminated, since contamination in a track is no longer a concern.

Figure 3:
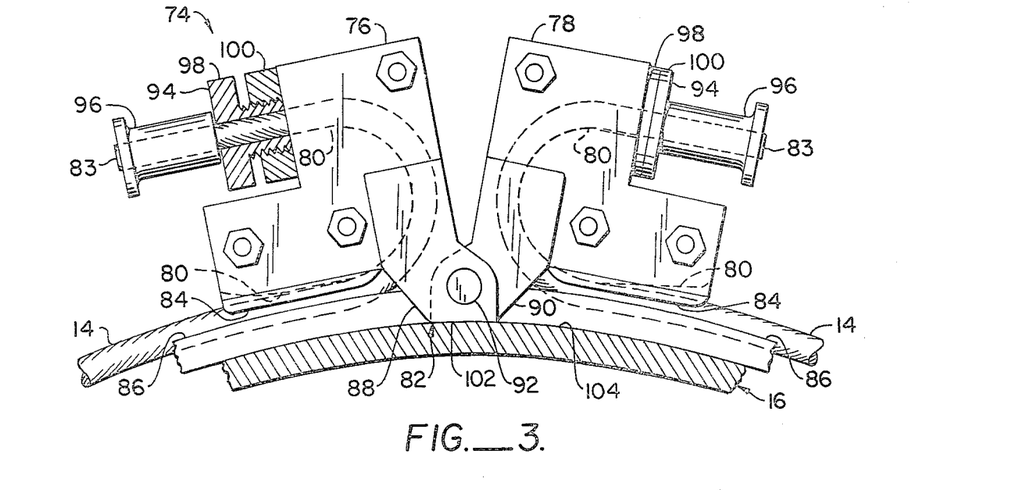
FIG. 3 is a side elevational view of a further wire rope connector according to the invention.

One form of rope connector 74 for the apparatus is shown in FIG. 3. The connector 74 consists of a pair of body pieces 76 and 78 joined at a hinge 82. The pieces 76 and 78 are each provided with annular recesses or grooves 80 which are outwardly disposed to receive a wire rope 14 near its cut ends 83. The grooves 80 follow an arcuate path along a medial axis of the body pieces 76 and 78 and are symmetrically positioned so that the central axis of the grooves are substantially in longitudinal alignment and orthogonal to the axis of the hinge 82. The outer side edges 84 of the groove 80 which is adapted to face a groove track 86 in a sheave 16 is disposed to mate with groove track 86 in the sheave 16. The groove track may be defined by double parallel ribs around the sheave.

The placement of the connector hinge 82 orthogonal to the longitudinal alignment of the wire rope 14 is important to the advantageous operation of the invention. The hinge 82 may consist of two pairs of interleaved hinge pieces 88 and 90 locked together with two hinge pins 92, one at each side of the body pieces 76 and 78. The hinge 82 is oriented to be pivotal substantially on the intersecting orthogonal of the wire rope 14 so that flexure of the connector 74 as it passes over the sheave or over the drum is centered at the hinge pins 92. Consequently, such flexure of the connector 74 minimizes the flexure of the wire rope along its curved path.

Alternatively, (FIG. 10) the hinge 82 of a flexible wire rope connector 74 may be a rolling bearing consisting of first and second hinge pieces 288 and 290 which have interlocking wings adapted to abut one another at load bearing convexities transverse of the medial axes of the wire rope 14. For example, the first hinge piece 288 may be a wing extending perpendicular to the medial axes of the wire rope portion which extends from the first body piece 76. First load bearing surface 292 of first hinge piece 288 is disposed away from the second body piece 78. The second hinge piece 290 may comprise a hook-shaped arm bolted to the second body piece 78, having a second load bearing surface 294 disposed away from the first body piece 76, yet overlapping first hinge piece 288 to abut the first load bearing surface 292. The requirement for hinge flexure is relative convexity between the first and second load bearing surfaces 292, 294, that is, the surfaces must having differing radii of curvature so that they may rock against one another. The first load bearing surface 292 may be flat while the second load bearing surface 294 may be convexed to the plane parallel to the flat load bearing surface 292. Alternatively, load bearing surface 292 may be concave while the second load bearing surface 294 may be convex but have a smaller radius of curvature than the negative radius curvature of the first load bearing surface 292. Slippage of the body pieces 76 and 78 may be minimized by placing a retaining block 296 on first body piece 76 at a location which blocks slippage of hinge piece 290 on one side while the hinge piece 292 blocks slippage of hinge piece 290 on the opposing side of hinge piece 290 as shown in FIG. 10.

Figure 10:
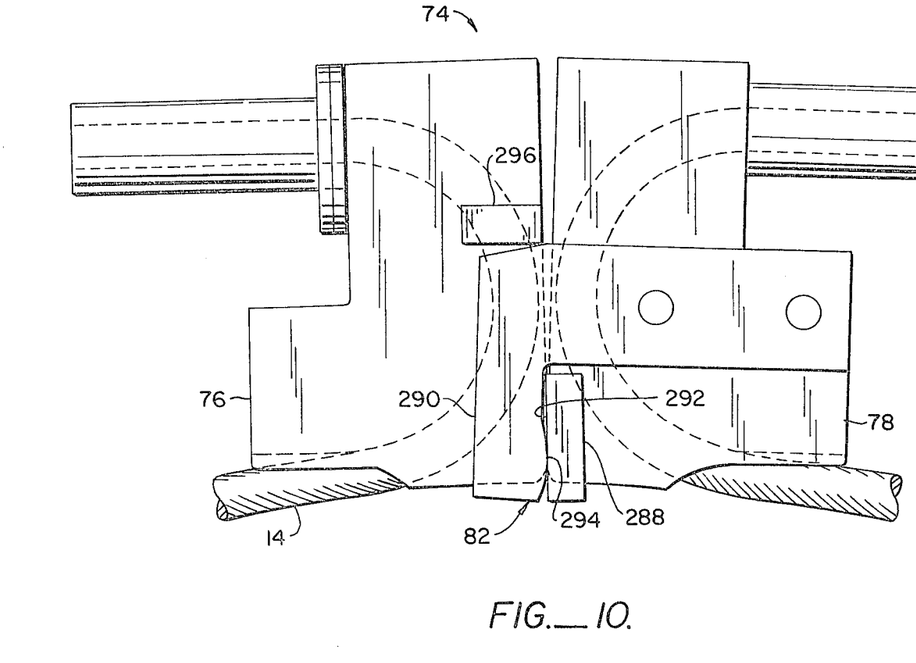
FIG. 10 is a side elevational view of a further wire rope connector according to the invention.

A hinge design as shown in FIG. 10 provides a number of advantages. First of all, it substantially eliminates sliding friction between load bearing surfaces of the hinge 82. The consequence is that the hinge need only overcome rolling friction between the load bearing surfaces 292 and 294. Moreover, the hinge is self-aligning within the slippage allowances of the blocking piece 296 and the wing of hinge piece 288.

Referring now to FIG. 3, the connector 74 may also include an adjustment mechanism 94 at the ends 83 of the wire rope 14. The tension adjustment mechanism 94 may consist of a ferrule 96 swage-connected to the end of wire rope and a mated pair of adjustment mechanism 94 at the ends 83 of the wire rope 14. The tension adjustment mechanism 94 may consist of a ferrule 96 swage-connected to the end of wire rope and a mated pair of adjustment spacers 98 and 100 through which the rope 14 is passed. The adjustment nuts 98, 100 provide variable spacing between the body of the bridge piece 76, 78 and the swaged end caps 83.

As an aid to the alignment of a connector passing over a sheave or a drum and to further minimize frictional and fatigue wear, the hinge plates 88 and 90 are provided with a bearing surface 102 along the sheave-confronting edge of the hinge 82. The bearing surface 102 is adapted to encounter an outwardly disposed rim 104 on the sheave 16 as well as a similar surface on the drum. The bearing surface 102 rides the sheave to maintain the neutral axis and to compensate for the reduction of load friction due to displacement of the rope from the sheave at the connector 74. Moreover, the placement of the rim 104 relative to the bearing surface 102 maintains the circumferential alignment of the body pieces 76 and 78.

A connector 74 of the type described above prevents rope-shortening each time the body pieces 76, 78 pass over a sheave or around a drum it also prevents jerking of the rope against the drum, and the shoulder of the hinge aids in the alignment of the connector piece 74 as it passes over the drum or the sheave. Furtheremore, the hinged connector minimizes the flexure in the rope as it passes over the curved surface of the sheave.

Figure 4:
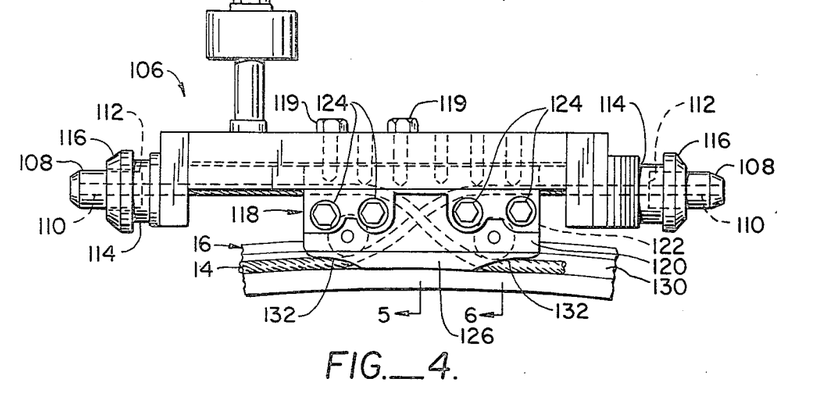
FIG. 4 is a side elevational view of a further wire rope connector according to the invention.

In FIGS. 4, 5 and 6, a rigid connector 106 is shown, as might be used in applications where the radius of curvature is relatively large. A ferrule 108 is swaged onto each of the terminal ends 110 of the wire ropes 14 and is adapted to seat at its inner end in a counterbore 112 of a sleeve 114 that, in turn, has a radially outwardly projecting flange 116 around its outer end. Sleeves 114 are positioned on the cable 14 before the ferrules 108 are swaged thereon. The inner end of each ferrule 108 will seat against the axially outwardly facing shoulder of the counterbore 112. The connector includes a central connector piece 118 through which the end portions of wire rope 14 pass in an cross over pattern and which can be shifted relative to the terminal ends 110 by rolocation of bolts 119. The central connector piece 118 in the housing 106 has mated body halves 120 and 122 which are bolted together with bolts 124. The sides of the bodies 120 and 122 along the sheave confronting face are beveled to form a V-shaped ridge or bridge 126 aligned with the wire rope 14 and adapted to be received in the outwardly opening V-shaped groove 128 in the sheave 16 when the flat inner surfaces of the body portions 120 and 122 are clamped together to clamp the end sections of the wire rope 14 together.

According to the invention, the bodies 120 and 122 include a load bearing surface 130 laterally adjacent the V-shaped groove 128, as shown most clearly in FIG. 5. The load-bearing surfaces 130 are adapted to abut the sheave 16 and are for relieving the V-shaped bridge 126 of its load and for realigning the bridge piece 118 with the V-shaped groove 128 of the sheave 116 at each encounter with the sheave 16. This saves the wire rope 14 from excessive wear at a connector piece corner 132 shown in FIG. 6 and FIG. 4. Furthermore, at this point (132), where the wire rope 14 disengages the groove 128, the rope 14 is subjected alternatively to longitudinal tension and transverse pressure, as well as transverse flexure, all of which may severely fatigue the strands of the rope 14 causing ultimate failure. While a hinged connector reduces the degree of flexure required proportional to the length of the portion of the connector confronting the sheave, i.e., about half, there are many applications where a hinged connector as herein described is not preferred. For such applications, the non-hinged connector 106 of FIGS. 4, 5 and 6 is preferred.

Figure 7:
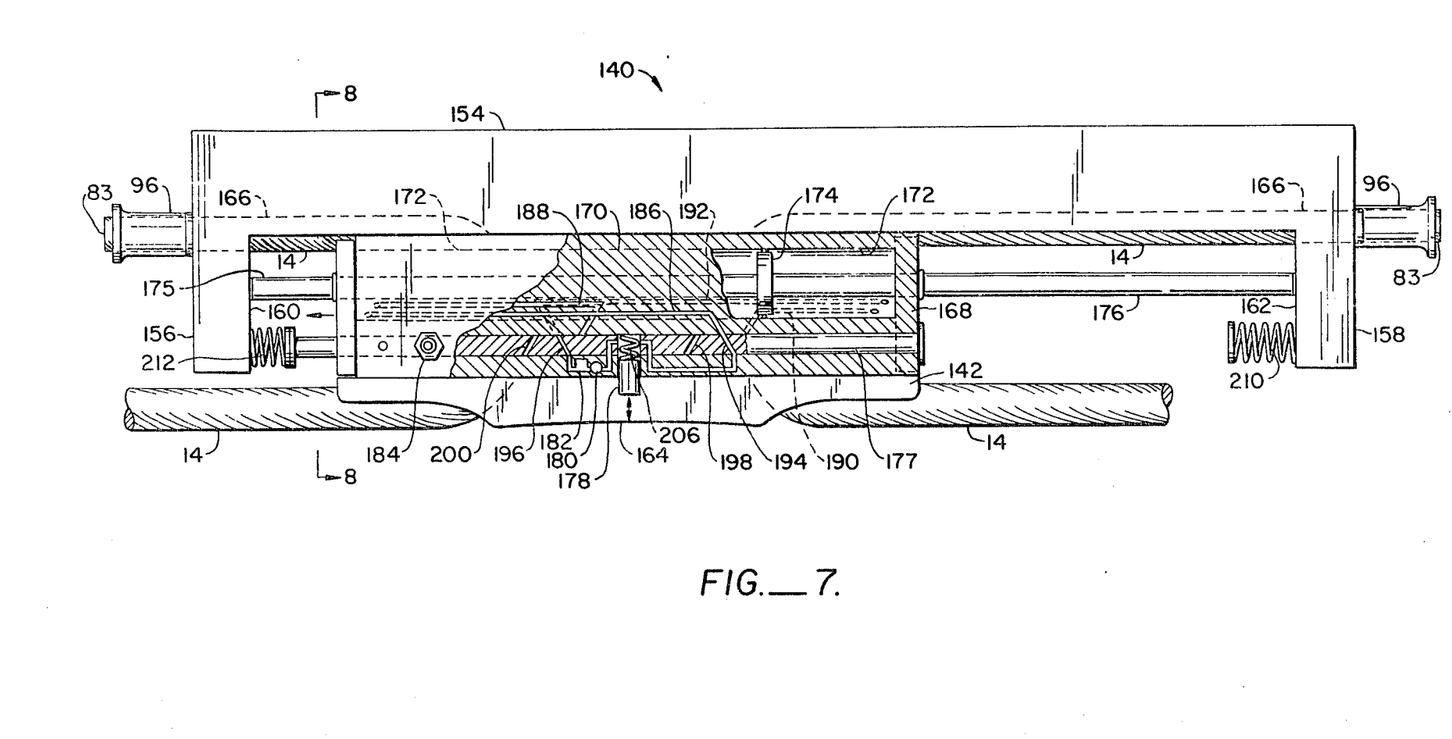
FIG. 7 is a side elevational view in partial cross section of a still further wire rope connector according to the invention.
Figure 8:
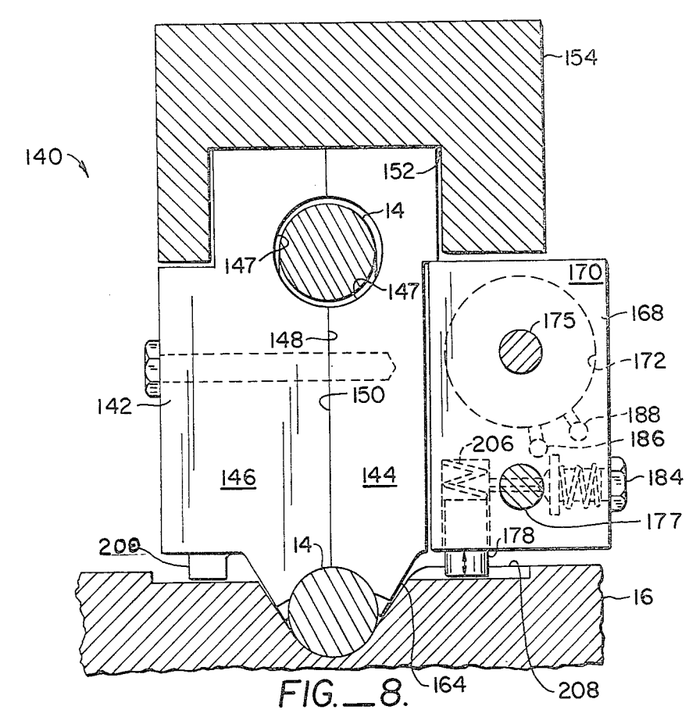
FIG. 8 is an end view of the device of FIG. 7 along line 8—8, together with a cross-sectional view of a portion of a sheave.
Figure 9:
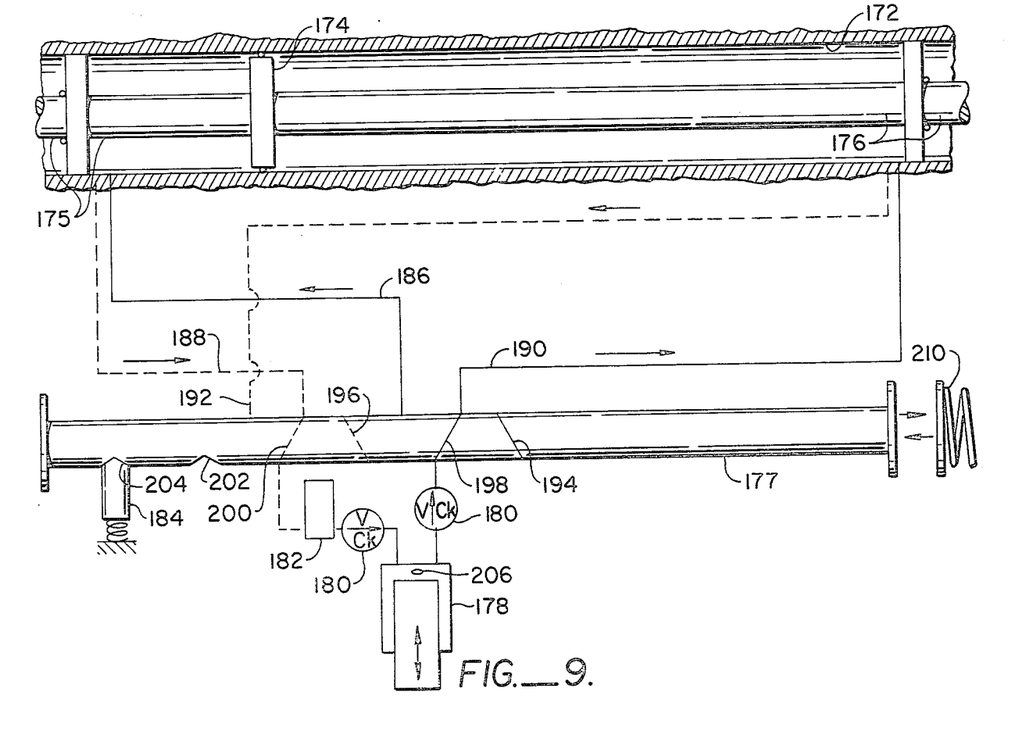
FIG. 9 is a schematic diagram of a hydraulic circuit of the device of FIG. 7.

FIGS. 7 and 8 illustrate a still further wire rope connector 140. Wire rope connector 140 comprises a body portion or piece generally designated 142 which is divided into a pair of halves 144 and 146, as shown in FIG. 8. These halves each have generally X-shaped recesses 147 along the mating faces 148 and 150, which recesses are of sufficient depth at their intersection for crossing of the end portions of the wire rope 14. The body piece 142 rides along a track 152 within a shifter bar 154. The shifter bar includes the longitudinally extended track with end pieces 156 and 158 extending laterally from the ends thereof to present opposing faces 160 and 162 to the ends of the body piece 142. The body piece 142 also includes a V-shaped ridge 164 aligned with the wire rope 14. The ends 83 of the wire rope 14 are provided with a ferrule 96 such that the wire rope is secured in a longitudinally extending channel 166 of the shifter bar 154. According to the invention, means are provided for advancing the body portion between the end faces 160 and 162 of the shifter bar thereby varying the location of ridge 164 relative to the wire rope 14 so that fatigue at any single point along the wire rope 14 near the end portions is minimized. For this purpose, a hydraulic shifting mechanism generally designated 168 is attached to the body piece 142. The hydraulic shifting mechanism 168 comprises a housing 170, a two-way hydraulic cylinder 172, longitudinally disposed within the housing 170, a relatively thin hydraulic piston 174 moveable within the cylinder 172, a first ram 175 and a second ram 176 coaxially extending from piston 174, a shuttle valve 177 disposed parallel to the rams 175 and 176, a hydraulic pump 178, a pair of check valves 180, an accumulator reservoir 182, a friction stop 184 disposed along the shuttle valve 177 and sundry hydraulic circuits 186, 187, 188, 189, 190 and 192 (FIGS. 7, 8, and 9).

The rods 175 and 176 extend from the piston 174 to abut the opposing overlapping end walls 156 and 158, respectively. The piston 174 is moveable within the cylinder 172 such that the shifter mechanism 168 is displaceable relative to the shifter bar 154, and therefore also relative to the end portions of the wire rope 14. The hydraulic piston 174 is moveable in response to hydraulic pressure supplied through the hydraulic power system of the shifter mechanism. The direction of movement of piston 174 is determined by the position of shuttle valve 177, which is a rod having four transverse passages 194, 196, 198 and 200 for coupling the hydraulic pump 178 and related hydraulic circuits 187, 189 alternately to the opposingchambers of cylinder 172.

Shuttle valve 177 is moveable between two stable positions. The rod of shuttle valve 177 includes two notches 202, 204 which are operative to be engaged by friction stop 184. The notches 202, 204 are spaced to conform with the spacing between passageway 186, 188 and 190, 192.

The hydraulic pump 178 comprises a piston having a rod or end exposed and disposed transverse to the direction of travel of the wire rope 14. A spring 206 or the like biases the piston to a position maintaining the cylinder chamber of the hydraulic pump at maximum volume. The pump is operative to produce a discrete amount of hydraulic pressure when the piston encounters a raised shoulder 208 (FIG. 8) of sheave 16 as the wire rope 14 and connector 140 pass over the sheave 16. The body piece 146 may include a foot 209 (FIG. 8) disposed to confront the face of sheave 16 on the opposing side of the wire rope. Foot 209 counteracts any tendency by the connector 142 twist thereby to inhibit operation of the pump 178.

Alternatively, the pump 178 may be located to face radially outward of the sheave 120 and disposed to interact with a roller or fixed cam surface adjacent the path of the connector 140.

The details of the operative features of the hydraulic system are best understood with reference to FIG. 9. In FIG. 9, shuttle valve 177 is aligned so that passage 198 is in line with input circuit 190 feeding one chamber of cylinder 175 and passage 200 is in line with circuit 188 which is return from the other chamber of cylinder 175. In this position friction stop 184 is resting in notch 204 and circuits 186 and 192 are sealed. In this position, shuttle valve 177 is displaced to its furthest position to the right. In operation, the piston of pump 178 encounters shoulder 208 of sheave 16 displacing the piston and pressurizing the hydraulic fluid. Check valve 180 blocks hydraulic pressure to return circuit 188 so that hydraulic pressure is directed along circuit 190 to the right hand chamber of cylinder 175. The piston 174 is urged to the left, and the pressure in the left chamber of cylinder 172 is relieved through circuit 188 and passage 200 at accumulator 182. The rod 175, being in abutting relation to wall 156 (not shown in FIG. 9) urges the entire shifting mechanism 168 toward the right relative to the shifter bar 154. This displacement results in the relocation of the V-shaped ridge 164 relative to the end portions of wire rope 14. Displacement continues in this manner until the right end of shuttle valve 177 engages wall 158 through a coil spring 210. As the end of shuttle valve 177 is urged toward wall 158 spring 210 compresses until the friction stop 194 disengages notch 204. Shuttle valve 177 is thrown quickly toward the left by spring 210 until friction stop 184 latches notch 202. The alignment of stop 184 and notch 202 reverses the hydraulic circuit couplings, 187, 189 aligning passage 194 with input circuit 186, blocking input circuit 190 and aligning passage 196 with return circuit 192, blocking return circuit 188 (FIG. 7). In this hydraulic circuit alignment, the displacement direction of piston 174 is reversed.

Each time hydraulic pump 178 is actuated, piston 174 displaces toward the right within cylinder 172. Such displacement continues until the left hand end of shuttle valve 177 encounters wall 156 of the shifter bar 154 through a spring 212 (FIG. 7). Upon the build-up of sufficient compression in spring 212, shuttle valve 177 is displaced toward the right, thereby again reversing the direction of movement of the ridge 164 relative to the end portions of the wire rope 14.

The relative movement of the ridge 164 and wire rope 14 is preferably extremely slow. For exaple, one entire cycle between extremes of the shifter bar 154 may take as long as one hundred thousand flexures of the wire rope 14. However, it is not necessary that the hydraulic pump 178 be operated with each flexure of the wire rope 14. In order to reduce the number of operations of the hydraulic pump 178, the shoulder 208 of the sheave 16 may extend only a fraction of the distance around the circumference of the sheave 16. So long as the radius of the sheave 16 is a nonintegral multiple of the radius of the drum 10 (FIG. 1) or so long as there is slippage between the sheave 16 and the wire rope 14, the hydraulic pump 178 will be periodically actuated.

The hydraulic shifter mechanism as herein described merely illustrates one embodiment of a mechanism suitable for solving the problem herein addressed. For example, it should be understood that a hydraulic shifter mechanism is not limited to be useful with body pieces wherein the wire rope end portions cross and are fastened to opposing ends of a solid shifter bar. The embodiment herein shown and those embodiments suggested by the invention may be incorporated in such connectors as have been described in conjunction with FIG. 3, for example.

Having thus explained the invention and the various embodiments and also having pointed out the various advantages of each aspect of the invention, it should be understood that still further embodiments are contemplate without departing from the scope of the invention. Therefore, it is not intended that this invention be limited except as indicated by the appended claims.

I claim:

1. The combination with a horizontally extending hollow cylindrical drum for bearing material therein for processing, comprising:
    a plurality of sheaves spaced over said drum and spaced from each other along an axis parallel with the central axis of said drum for rotation;
    means connected to said sheaves for supporting and rotating said sheaves;
    a connecting cable means extending around below said drum and around over said sheaves for rotating said drum upon rotation of said sheaves;
    means mounted laterally of and abutting to said drum for carrying a laterally directed load; and
    means mounted to abut to said drum at a position on said exterior above and substantially opposing the center of mass of material along the interior side wall within said drum when said drum is rotating for selectively loading said drum, wherein said selective loading means comprises an idler arm overlying said drum; roller means for riding said drum; and bias means coupling said idler arm and said roller means for pressing said roller means against said drum to increase traction between said drum and said cable.

2. An apparatus according to claim 1 wherein said bias means comprises a coil spring coupling said idler arm and said roller means.

3. An apparatus according to claim 1 wherein said bias means comprises a hydraulic cylinder coupling said idler arm and said roller means.

4. The combination with a horizontally extending hollow cylindrical drum for bearing material therein for processing, comprising:
    a plurality of sheaves spaced over said drum and spaced from each other along an axis parallel with the central axis of said drum for rotation;
    means connected to said sheaves for supporting and rotating said sheaves;
    a connecting cable means extending around below said drum and around over said sheaves for rotating said drum upon rotation of said sheaves;
    means mounted laterally of and abutting to said drum for carrying a laterally directed load; and
    means mounted to abut to said drum at a position on its exterior wall above and substantially opposing the center of mass of material along the interior side wall within said drum when said drum is rotating for selectively loading said drum, wherein said selective loading means is mounted for confronting said drum on its upper margin generally aligned with a plane through said central axis and the center of gravity of a rotating drum carrying a load, wherein said sheaves are disposed along a single horizontal axis and wherein said sheave axis is laterally offset from the vertical plane through the central axis of said drum such that the center of gravity of said load material when said drum is turning is substantially along said vertical plane to increase traction between said drum and said cable.

5. In combination, a horizontally extending cylindrical drum for bearing a material for processing, a plurality of sheaves spaced above and supported over said drum for rotation about an axis parallel with the central axis of said drum, said sheaves comprising a continuous load bearing surface adjacent both sides of an outwardly opening V-shaped circumferential groove, wire ropes extending around said drum and sheaves in a manner suspending said drum from said sheaves for rotation of said drum and sheaves together, each of said ropes terminating in opposite end portions, a wire rope connector for coupling said opposite end portions of each rope in an endless loop, said connector comprising first and second mating pieces defining body means through which end portions of said wire rope are coupled, means for aligning said wire rope and adapted to align said wire rope to be received in said outwardly opening groove of said sheaves, load bearing surfaces laterally adjacent said aligning means, said load bearing surfaces of said body means being adapted to abut and mate with the sheave along said sheave load bearing surfaces for maintaining a neutral axis of said rope system.

6. The invention of claim 5 further comprising a housing for securing the end portions of said wire rope and wherein said body means is longitudinally translatable relative to said housing so that said body means can be relocated relative to the end portions of said wire rope.

7. In combination with a horizontally extending cylindrical drum for bearing a material for processing, a plurality of sheaves spaced above and supported over said drum for rotation about an axis parallel with the central axis of said drum, wire ropes extending around said drum and sheaves in a manner suspending said drum from said sheaves for rotation of said drum and sheaves together, each of said wire ropes terminating in opposite end portions, a wire rope connector for coupling said opposite end portions of each rope in an endless loop, said connector comprising a housing for maintaining said end portions of said wire rope substantially fixed relative to one another; a body piece coupled to said housing and translatable relative to said wire rope in alignment with said wire rope; and longitudinal recesses in alignment with said body piece for accommodating the passage of said wire rope therethrough and for maintaining said wire rope in alignment with said sheave and a hydraulic shifting mechanism for reciprocally translating said body piece relative to said housing and said wire rope upon periodic engagement between said connector and said sheaves.

8. The combination of claim 7 wherein said hydraulic shifting mechanism includes a reciprocatory hydraulic piston within a hydraulic cylinder including ram means disposed to abut opposing portions of said housing for driving said body piece and for urging the translation of said body piece relative to said housing, a hydraulic pump operative in response to periodic engagement with an opposing surface and a shuttle valve for reversibly coupling the hydraulic output of said hydraulic pump between opposing portions of said hydraulic cylinder.

9. The combination of claim 8 wherein said shuttle valve includes bias means for regulating the reversal of travel of said piston.

10. The combination of claim 8 wherein said sheave includes said pump opposing surface and wherein said pump is operative to periodically abut said opposing surface.

* * * * *